US005590790A

United States Patent [19]

Saunders

[11] Patent Number: 5,590,790

[45] Date of Patent: Jan. 7, 1997

[54] APPARATUS INCLUDING A VACUUM PUMP FOR ASSESSING THE CONDITION OF A BANK NOTE BY MEASURING AIRFLOW DRAWN THROUGH THE BANK NOTE

[75] Inventor: Andrew G. Saunders, Newport, Great Britain

[73] Assignee: AT&T Global Information Solutions Company, Dayton, Ohio

[21] Appl. No.: 361,061

[22] Filed: Dec. 19, 1994

[30] Foreign Application Priority Data

Jul. 19, 1994 [GB] United Kingdom .................. 9414540

[51] Int. Cl.[6] ............................ B07C 5/00; G01N 15/08; B65H 7/02

[52] U.S. Cl. ............................ 209/534; 209/591; 73/38; 271/258.01

[58] Field of Search .................................... 209/534, 591, 209/599; 73/38; 271/258.01, 260, 261–263, 265.01, 265.02, 265.03, 265.04

[56] References Cited

U.S. PATENT DOCUMENTS

| | | | |
|---|---|---|---|
| 3,371,518 | 3/1968 | Keyes | 73/38 |
| 3,466,925 | 9/1969 | Kiegenhagen et al. | 73/38 |
| 3,773,321 | 11/1973 | Burroughs | 271/260 |
| 4,191,046 | 3/1980 | Baker et al. | 73/38 |
| 4,311,037 | 1/1982 | Gotchel et al. | 73/38 |
| 4,471,649 | 9/1984 | Cronshaw | 73/38 |
| 4,495,796 | 1/1985 | Hester et al. | 73/38 |
| 4,501,416 | 2/1985 | Hain | 209/534 X |
| 4,651,557 | 3/1987 | Cholet | 73/38 |
| 4,672,841 | 6/1987 | Schuster et al. | 73/38 |
| 4,676,091 | 6/1987 | Schuster et al. | 73/38 |
| 4,995,271 | 2/1991 | Kis | 73/38 |
| 5,081,863 | 1/1992 | Reid | 73/38 |
| 5,182,722 | 1/1993 | Hain | 209/599 X |
| 5,201,424 | 4/1993 | Hain | 209/599 X |

FOREIGN PATENT DOCUMENTS

| | | | |
|---|---|---|---|
| 357406 | 3/1990 | European Pat. Off. | 209/534 |
| 275351 | 11/1989 | Japan | 271/260 |
| 71227 | 3/1994 | Japan | 209/591 |

*Primary Examiner*—Boris Milef
*Attorney, Agent, or Firm*—James M. Stover

[57] ABSTRACT

An apparatus for assessing the condition of a bank note includes a vacuum pump (4), an air flow detector (8) for producing an electrical output indicative of air flow through the detector (8), and a suction device (10) connected to the vacuum pump (4) via the air flow detector (8). In operation, a bank note is fed from an entry slot into cooperative relationship with the suction device (10) such that the bank note covers, and is sucked against, the suction device (10). An electronic control device is coupled to the detector (8) and is arranged to make a determination of the condition of the bank note based on the electrical output of the detector (8), this output being representative of the porosity of that part of the bank note sucked against the suction device (10).

10 Claims, 4 Drawing Sheets

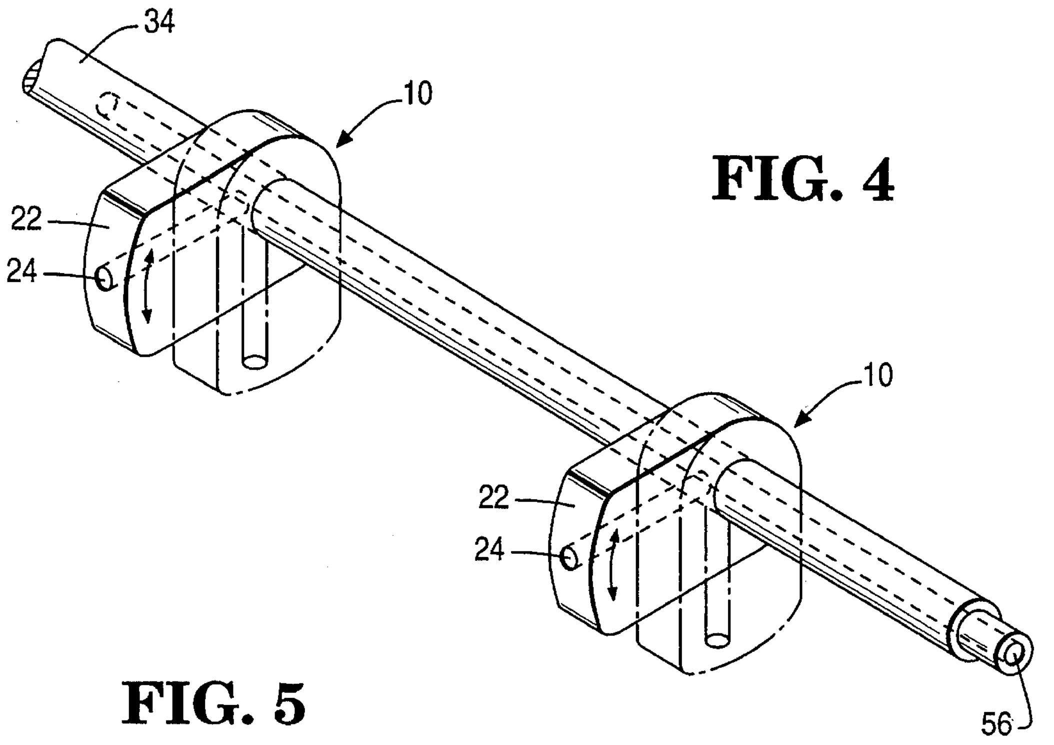
FIG. 4
FIG. 5
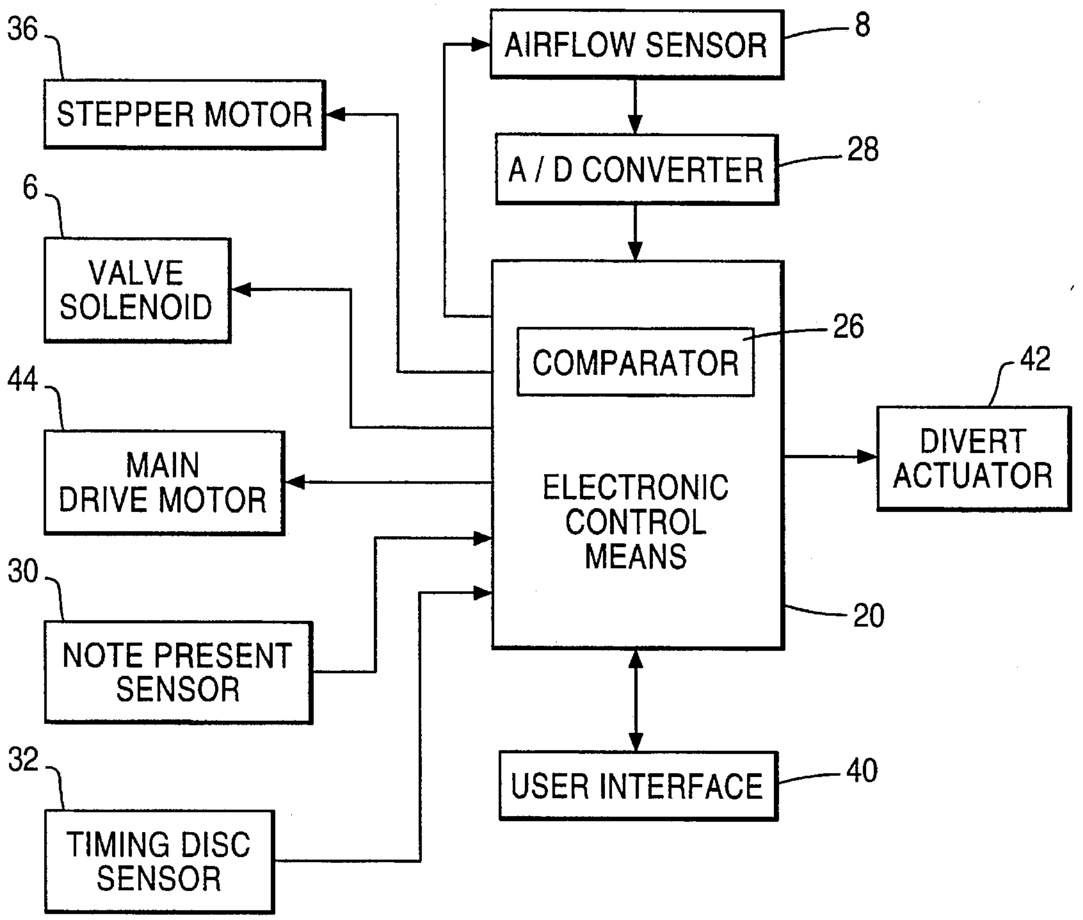

APPARATUS INCLUDING A VACUUM PUMP FOR ASSESSING THE CONDITION OF A BANK NOTE BY MEASURING AIRFLOW DRAWN THROUGH THE BANK NOTE

The invention relates to an apparatus for assessing the condition of a bank note.

BACKGROUND OF THE INVENTION

It has been found that the porosity of a bank note increases from new due to abrasion and other kinds of wear caused by the normal daily handling of the note.

The porosity of a bank note is particularly important if the bank note is to be used in an ATM which utilizes vacuum techniques to pick a bank note from a currency cassette within the ATM for dispensing to a customer.

If the porosity of the bank note is such that a suction device used to pick the bank note from a currency cassette is unable to engage the bank note securely, the ATM will fail. Such a failure will result in an increase in the downtime of the ATM in which the ATM is unable to dispense cash to or receive cash from a customer.

OBJECTS OF THE INVENTION

It is an object of the present invention to provide an apparatus for assessing the condition of a bank note so as to determine its suitability for use in an ATM employing suction pick means.

SUMMARY OF THE INVENTION

According to the present invention there is provided an apparatus for assessing the condition of a bank note, including pump means for generating a reduced pressure, a detector for producing an electrical output indicative of air flow through said detector, suction means connected to said pump means via said detector, means for feeding a bank note from an entry location along a first feed path into co-operative relationship with said suction means such that, in operation, said bank note covers, and is sucked against, said suction means, electronic control means coupled to said detector and arranged to make a determination of the condition of said bank note based on said electrical output, and second feed means for feeding said bank note along a second feed path away from said suction means subsequent to said bank note having been sucked against said suction means.

An apparatus in accordance with the invention may form part of a cash recycling ATM in which the condition of currency notes deposited by one customer is assessed in order to determine if the notes are suitable for storing and subsequent dispensing to another customer. The apparatus can also be used as part of a screening system for screening bank notes prior to loading the notes into currency cassettes for use in ATMs.

BRIEF DESCRIPTION OF THE DRAWINGS

An embodiment of the present invention will now be described, by way of example, with reference to the accompanying drawings in which:

FIG. 4 is an enlarged perspective view of suction means of the apparatus; and FIG. 5 is a block circuit diagram of the apparatus.

DETAILED DESCRIPTION OF THE PREFERRED EMBODIMENT

Figure 1:
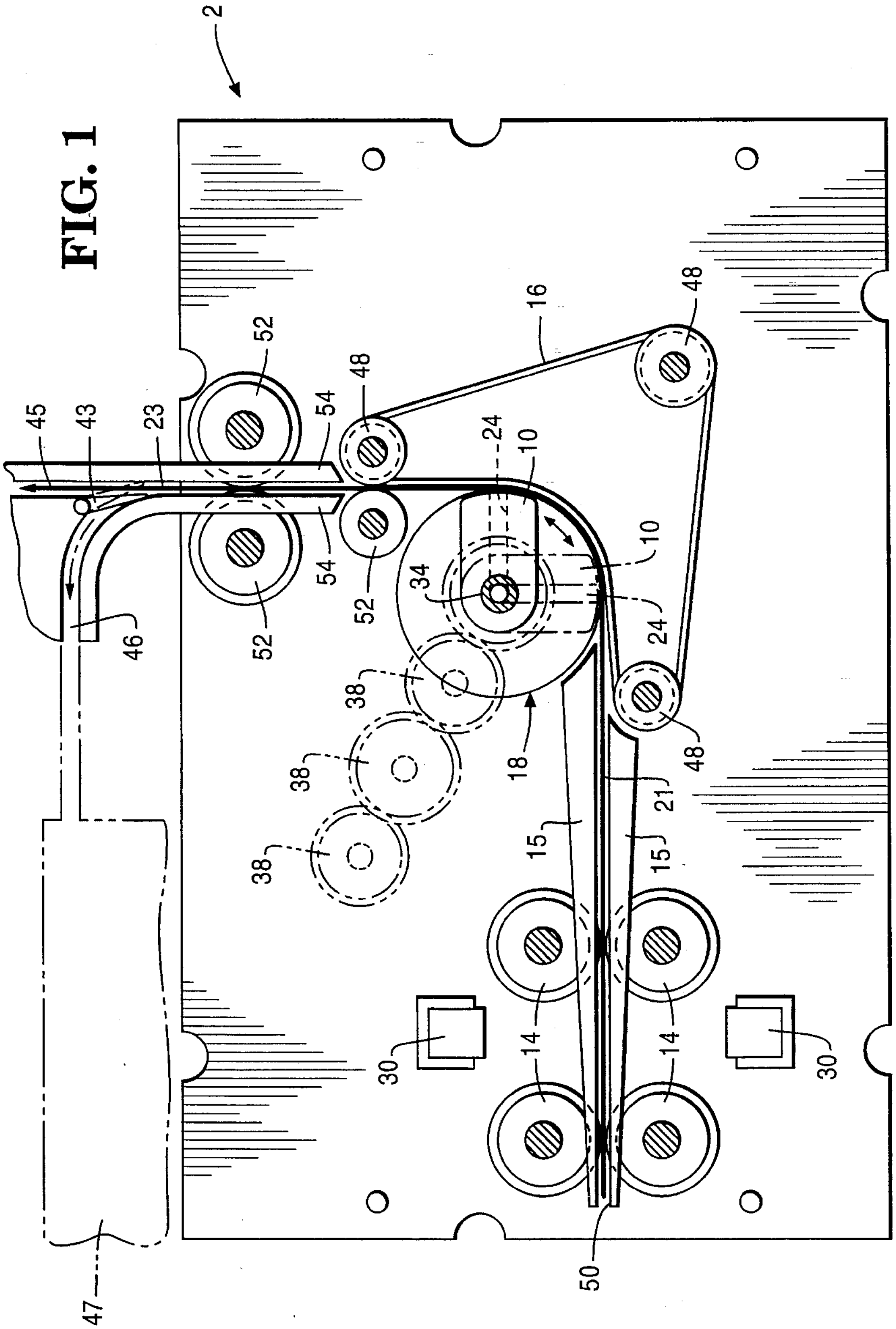
FIG. 1 is a side view of an apparatus in accordance with the present invention.

FIGS. 1 to 5 illustrate an apparatus 2 for assessing the condition of a bank note. The apparatus 2 incorporates a vacuum pump 4, a solenoid operated valve 6, a detector 8 for producing an electrical output indicative of air flow through the detector, and pivotally mounted suction means 10. The elements 4, 6, 8 and 10 are connected together via a vacuum line 12 such that, in operation, reduced pressure can be applied by the pump 4 to the suction means 10 via the detector 8 by energization of the solenoid of the valve 6.

The detector 8 is a Honeywell AWM5101V mass air flow detector, although other suitable detectors may be utilized.

Figure 2:
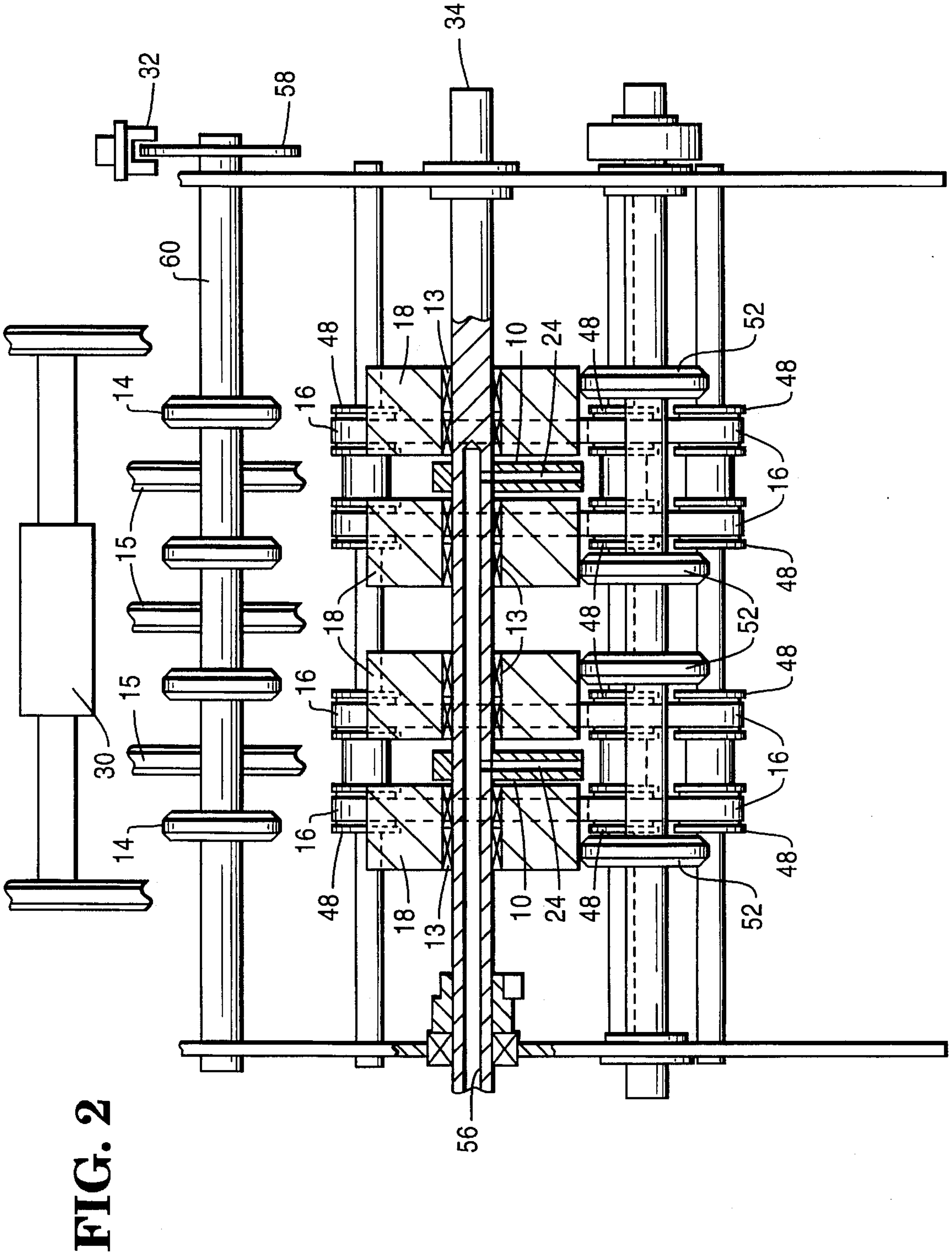
FIG. 2 is a plan view, shown partly in section, of part of the apparatus of FIG. 1.
Figure 3:
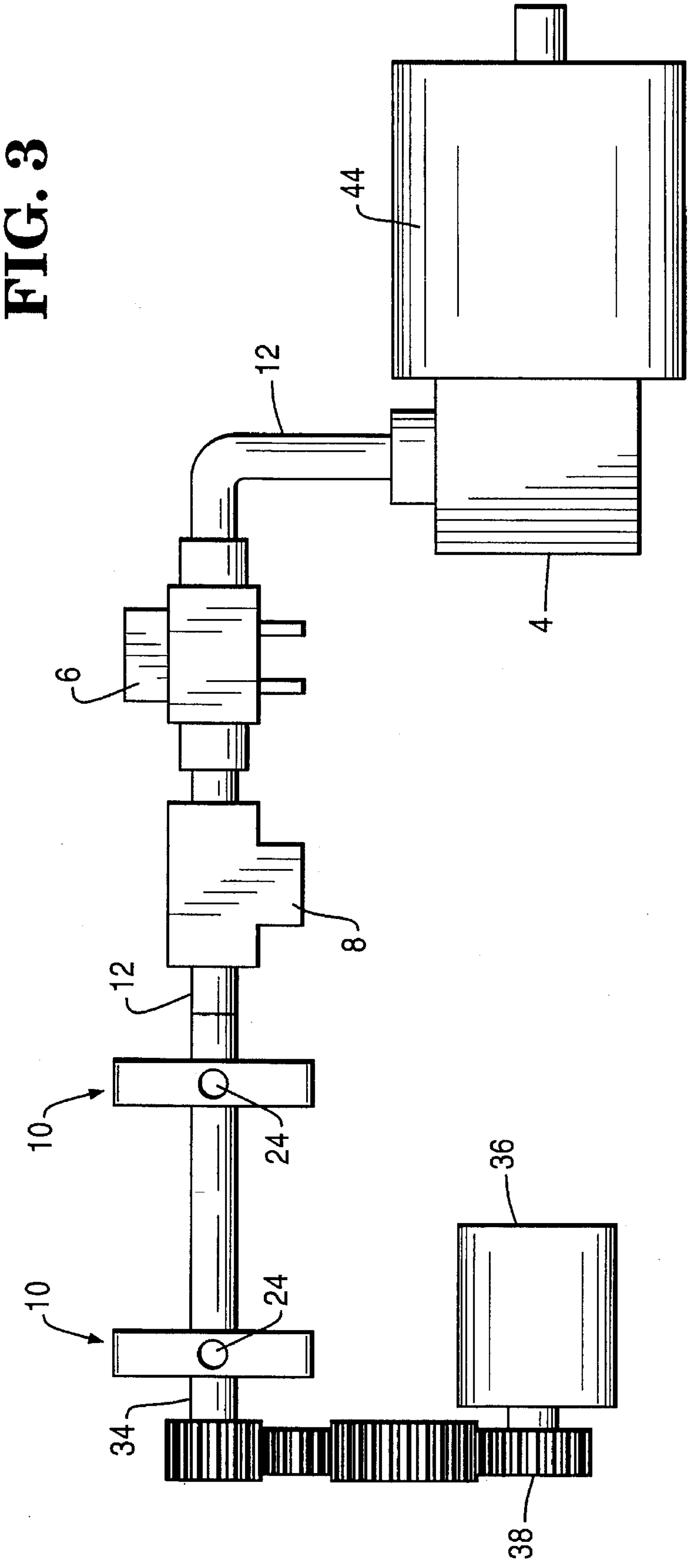
FIG. 3 is a schematic diagram of a vacuum system of the apparatus which enables mass air flow detection.

First feed means 14, 16 in the form of rollers 14 and endless belts 16 are arranged along with guide means 15, 18 so as to bring a bank note into co-operative relationship with the suction means 10, when in use. Each endless belt 16 passes around associated pulleys 48, as best seen in FIG. 1. The outer surfaces of the belts 16 respectively extend partly around the circumferences of associated cylindrical members which form the guide means 18. The first feed means 14,16 and guide means 15,18 are arranged as illustrated in FIGS. 1 and 2 to feed a bank note from an entry slot 50 along an inward feed path 21 into cooperative engagement with the suction means 10. A note present detector 30 is positioned near the entry slot 50 for detecting the leading edge of a bank note fed along the feed path 21.

When the condition of the bank note is being assessed, the bank note covers, and is sucked against, the suction means 10. Electronic control means 20 (FIG. 5) coupled to the detector 8 provide an indication of the condition of the bank note based on the electrical output of the detector 8.

An outward feed path 23 from the suction means 10 divides into alternative exit paths 45,46 for acceptable and unacceptable bank notes respectively. Notes are driven along the outward feed path 23 by the belts 16 and additional feed rollers 52 associated with further guide means 54, as illustrated in FIG. 1. For the sake of clarity the guide means 54 and some of the rollers 52 are not shown in FIG. 2. A note divert gate 43 is positioned at the junction of the exit paths 45,46. The gate 43 is operated by the electronic control means 20 via a divert actuator 42 so as to divert unacceptable banknotes into the exit path 46 for storage in a receptacle 47. Acceptable bank notes are fed along the other exit path 45 for storage in a currency cassette (not shown) for later use in an ATM.

The suction means 10 is formed by two substantially rectangular blocks, an end surface 22 of each of which abuts a bank note during the detection process (FIG. 4). Each of the blocks forming the suction means 10 has an internal bore 24 running from the surface 22 to a shaft 34 on which the suction means 10 is mounted. The internal bore 24 of each block is connected to the vacuum means 4,6 via an internal bore 56 in the shaft 34 which is connected to the vacuum line 12. It should be understood that the shaft 34 is connected to the vacuum line 12 in such a manner as to permit pivotal movement of the shaft 34 relative to the line 12.

Each surface 22 has a resilient coating of plastics material which aids the production of a vacuum seal between the suction means 10 and a bank note. The end surfaces 22 are curved and have the same radius of curvature as the guide means 18, which aids the vacuum seal between the suction means 10 and the note during rotation of the suction means 10, as will be discussed further below.

The assessment of a bank note is achieved by the vacuum pump 4 drawing air through the vacuum system from the suction means 10, thus drawing the bank note tightly into contact with the surfaces 22 of the suction means 10.

The feed means 14, 16 and guide means 15,18 are further arranged such that a bank note is presented to the suction means 10 in a plane substantially orthogonal to the bores 24 of the suction means 10, whereby the best possible seal is provided between the bank note and the suction means 10.

As the bank note is porous to some extent, air will be drawn through the bank note into the vacuum system. The rate of flow of air drawn into the system is proportional to the porosity of that part of the bank note covering the bores 24 of the suction means 10. The air flow is measured by the mass air flow detector 8, which provides an analog voltage output representative of the mass flow of air through the bank note and the detector 8, and therefore indicative of the porosity of the relevant part of the bank note. This output is converted into a digital signal in an A/D converter 28 prior to being applied to a comparator 26 which is included in the electronic control means 20 and which compares this signal with a predetermined reference signal characteristic of a bank note which is acceptable for use in an ATM having vacuum pick means. As a result of this comparison, the electronic control means 20 makes a determination as to the acceptability of the bank note.

As will be explained later, the suction means 10 and the feed means 14,16 are arranged such that the control means 20 can control the cooperative positioning of the bank note with respect to the suction means 10, whereby the part of said bank note which is sucked against the suction means 10 may be changed. In this way the porosity of the bank note can be assessed in the areas which correspond to the areas of contact between the note and an ATM suction device when the note is picked from a bank note cassette. However, if a bank note has a hole or tear or other cause of increased porosity in some other area remote from the contact area it may still be suitable for use in an ATM. Such a note, which can be picked by a vacuum pick device, would not be approved for use if the porosity of the entire note was assessed. Consequently, notes which are acceptable for use in an ATM are not rejected unnecessarily by the present apparatus.

Shortly after a bank note enters the entry slot 50 of the apparatus 2, the leading edge of the note is detected by the input note present sensor 30. When it is in its home position, the suction means 10 is positioned as shown in chain outline in FIG. 1, with the bores 24 extending vertically. After the bank note has been fed by the feed rollers 14 to a position in which the note covers the outer ends of the bores 24, the solenoid operated valve 6 is activated so that the vacuum system causes the bank note to be sucked into contact with the suction means 10. The electronic control means 20 ascertains the time that elapses between the leading edge of the note being sensed by the sensor 30 and the activation of the valve 6 by counting pulses generated by a sensor 32 associated with a timing disc 58 (FIG. 2), the disc 58 being mounted on a drive shaft 60 for a set of the feed rollers 14 of the input feed means 14,16. The relative position of the bank note with respect to the suction means 10 when sucked against the suction means 10 can therefore be altered by altering the time which elapses between the detection of the leading edge of a bank note and the activation of the valve 6.

The cooperative positioning of the bank note with respect to the suction means 10 can be set by a user through a user interface 40 (FIG. 5), the interface 40 determining the number of pulses that are counted by the electronic control means 20 before activating the valve 6.

In order to improve the speed of operation of the porosity detection process, the shaft 34 is mounted in bearing means 13 (FIG. 2) so that the suction means 10 is pivotably movable with respect to the feed means 14,16,52 and the guide means 15,18,54 during the porosity detection process. The suction means 10 is mounted for pivotal movement through approximately 90° between its home position shown in chain outline in FIG. 1, in which position a bank note is sucked against the suction means 10, and a second position shown in solid outline in FIG. 1, in which position the valve 6 is deactivated so as to enable the bank note to be fed from the suction means 10 by the belts 16 and the feed rollers 52 along the outward feed path 23 and into the first or the second exit path 45 or 46, depending on whether or not the note is acceptable for use in an ATM. It should be understood that, while the bank note is held by suction in contact with the suction means 10, the note is carried between the suction means 10 and the endless belts 16 from the inward feed path 21 to the outward feed path 23 without any interruption in the feeding movement of the note. Bank notes can be tested at the rate of approximately 10 notes per second with this apparatus.

The shaft 34 on which the suction means 10 is mounted is driven by a stepper motor 36 through gears 38 (see FIG. 3), pivotal movement of the suction means 10 being commenced simultaneously with the activation of the valve 6. The feed means 14,16,52 are driven by a main drive motor 44 (FIG. 5) under the control of the electronic control means 20. The drive mechanisms are so arranged that the peripheral speed of the suction means 10 when rotating from its home position to said second position is substantially equal to the speed of the endless belts 16 driven by the pulleys 48.

The operation of the apparatus 2 will now be described. When the input sensor 30 detects the leading edge of a bank note to be assessed, a signal is sent by the sensor 30 to the control means 20 causing the control means to commence counting pulses from the timing disc sensor 32. After a predetermined number of pulses have been counted, the control means 20 activates the solenoid valve 6 thus actively connecting the suction means 10 to the vacuum pump 4 resulting in the bank note being drawn into contact with, and sucked against, the top surfaces 22 of the suction means 10. The number of timing pulses to be counted prior to the activation of the valve 6, and thus the parts of the note whose porosity is to be assessed, has previously been determined by a user via the user interface 40.

The control means 20 then activates the air flow sensor 8 to produce an analog voltage signal indicative of the porosity of those parts of the bank note covering the outer ends of the bores 24. As this assessment of the bank note is being carried out, the suction means 10 is rotated through approximately 90° as previously described. Thus, the bank note continues to be conveyed through the apparatus 2 as the assessment is carried out. The bank note is guided during rotation of the suction means 10 by the guide means 18 and the endless belts 16, with the note being held between the suction means 10 and the belts 16.

When the suction means 10 reaches said second position shown in solid outline, the solenoid of the valve 6 is deactivated so that the vacuum connection between the suction means 10 and the pump 4 is terminated. The bank note is then conveyed by the feed rollers 52 and the endless belts 16 from the suction means 10 along the outward feed path 23.

The analog voltage signal from the airflow detector 8 is converted into a digital signal in the A/D converter 28 and forwarded to the electronic control means 20 for comparison in the comparator 26 with a predetermined threshold signal characteristic of an acceptable bank note. As a result of this comparison, the electronic control means 20 makes a determination as to whether or not the bank note is acceptable for use in an ATM having vacuum pick means.

If the electronic control means 20 determines that the note is acceptable then it is fed along the exit path 45 for storage in a currency cassette. If a determination is made that the note is not acceptable, then the electronic control means 20 causes the divert actuator 42 to be operated so as to divert the note into the exit path 46 for storage in the receptacle 47. While the note is being fed from the suction means 10 to the exit path 45 or 46, the suction means 10 is rotated back to its home position in time to be brought into cooperative relationship with the next bank note to be assessed.

Advantageously in this preferred embodiment the positioning of a bank note relative to the suction means 10 when sucked against the suction means 10 may be altered. Thus, the suction means 10 can be arranged to detect the porosity of specific areas of a bank note which may correspond to the areas of the bank note which an ATM suction device contacts when picking a bank note from a storage cassette.

Also, in this preferred embodiment the suction means 10 is arranged to rotate together with the endless belts 16 during the detection of the porosity of the bank note. In this way the condition of a bank note may be assessed while the bank note is moving through the apparatus 2, thus increasing the number of notes which can be assessed by the apparatus 2 in a given time.

Although the presently preferred embodiment of the invention has been described, it will be understood that various changes may be made within the scope of the appended claims.

What is claimed is:

1. An apparatus for assessing the condition of a bank note, comprising:

pump means (4,6) for generating a reduced pressure;

a detector (8) for producing an electrical output indicative of air flow through said detector;

suction means (10) connected to said pump means (4,6) via said detector (8);

first feed means (14,16) for feeding a bank note from an entry location (50) along a first feed path (21) into cooperative relationship with said suction means (10) whereby said bank note covers, and is sucked against, said suction means (10);

electronic control means (20) coupled to said detector (8) and arranged to make a determination of the condition of said bank note based on said electrical output; and said pump means including a vacuum pump (4) and a solenoid operated valve (6) which controls the connection of said vacuum pump (4) to said suction means (10), operation of said valve being controlled by said electronic control means (20);

sensor means (30) for sensing said bank note as it is fed along said first feed path (21);

timing means (32) associated with said first feed means (14,16);

means for varying the time which elapses between the sensing of said bank note by said sensor means and the operation of said valve (6); and second feed means (16,52) for feeding said bank note along a second feed path (23) away from said suction means subsequent to said bank note having been sucked against said suction means.

2. Apparatus according to claim 1, further comprising:

divert means (42,43) associated with said second feed means (16,52) whereby said bank note is routed along a first exit path (45) upon a determination of the condition of said bank note by said electronic control means (20) being in an acceptable condition, and whereby said bank note is routed along a second exit path upon a determination of the condition of said bank note made by said electronic control means (20) being in an unacceptable condition.

3. Apparatus according to claim 2, characterized in that said detector (8) is a mass air flow detector.

4. Apparatus according to claim 1, characterized in that said detector (8) is a mass air flow detector.

5. Apparatus according to claim 1, wherein:

said electronic control means (20) is arranged to control the cooperative positioning of said bank note with respect to said suction means (10) whereby the portion of said bank note which is sucked against said suction means may be changed.

6. Apparatus according to claim 1, wherein:

said suction means (10) is adapted to be movable with respect to said first and second feed means (14,16,52) so as to move said bank note from said first feed path (21) to said second feed path (23) while said bank note is sucked against said suction means (10).

7. An apparatus according to claim 6, wherein:

said suction means (10) is adapted to rotate between a first position where said bank note is presented to said suction means (10) and a second position from where said bank note is transported along said second feed path (23).

8. Apparatus according to claim 7, further comprising:

belt means (16) associated with said suction means (10) whereby, during rotation of said suction means from said first position to said second position, said bank note is held between said suction means and said belt means.

9. Apparatus according to claim 8, further comprising:

divert means (42,43) associated with said second feed means (16,52) whereby said bank note is routed along a first exit path (45) upon a determination of the condition of said bank note by said electronic control means (20) being in an acceptable condition, and whereby said bank note is routed along a second exit path upon a determination of the condition of said bank note made by said electronic control means (20) being in an unacceptable condition.

10. Apparatus according claim 1, wherein:

said first feed means (14,16) is arranged to present said bank note to said suction means (10) such that a plane containing said bank note is substantially orthogonal to an internal bore (24) of said suction means (10) thus providing an effective vacuum seal between said bank note and said suction means (10).

* * * * *